(12) United States Patent
Cao et al.

(10) Patent No.: US 12,219,541 B2
(45) Date of Patent: Feb. 4, 2025

(54) CARRIER CONFIGURATION METHOD AND RELATED APPARATUS

(71) Applicant: HUAWEI TECHNOLOGIES CO., LTD., Shenzhen (CN)

(72) Inventors: Yongzhao Cao, Shenzhen (CN); Zhenghua Tang, Shanghai (CN); Jibin Wang, Shanghai (CN); Xianyong Ji, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 377 days.

(21) Appl. No.: 17/715,535

(22) Filed: Apr. 7, 2022

(65) Prior Publication Data
US 2022/0232570 A1    Jul. 21, 2022

Related U.S. Application Data

(63) Continuation of application No. PCT/CN2020/117770, filed on Sep. 25, 2020.

(30) Foreign Application Priority Data

Oct. 11, 2019 (CN) .......................... 201910964026.0

(51) Int. Cl.
*H04W 72/0453* (2023.01)
*H04L 5/00* (2006.01)

(52) U.S. Cl.
CPC ......... *H04W 72/0453* (2013.01); *H04L 5/001* (2013.01)

(58) Field of Classification Search
CPC ........................... H04W 72/0453; H04L 5/001
See application file for complete search history.

(56) References Cited

U.S. PATENT DOCUMENTS

| | | | |
|---|---|---|---|
| 2010/0081441 A1* | 4/2010 | Tao | ...................... H04W 72/541 455/450 |
| 2017/0230979 A1 | 8/2017 | Saxena et al. | |

(Continued)

FOREIGN PATENT DOCUMENTS

| | | |
|---|---|---|
| CN | 102273124 A | 12/2011 |
| CN | 107666690 A | 2/2018 |

(Continued)

OTHER PUBLICATIONS

3GPP TS 38.101-1 V16.1.0:"3rd Generation Partnership Project; Technical Specification Group Radio Access Network; NR; User Equipment (UE) radio transmission and reception; Part 1: Range 1 Standalone(Release 16)",Sep. 2019, total 280 pages.

(Continued)

*Primary Examiner* — Ajay Cattungal
(74) *Attorney, Agent, or Firm* — HAUPTMAN HAM, LLP

(57) ABSTRACT

Embodiments of this application disclose a carrier configuration method and a related apparatus, so that a terminal device can fully use a spectrum resource when the spectrum resource is greater than a maximum carrier bandwidth at a subcarrier spacing. Specifically, the method includes: A radio access network device obtains an available spectrum resource bandwidth and a maximum carrier bandwidth at a subcarrier spacing. If the available spectrum resource bandwidth is greater than the maximum carrier bandwidth, the radio access network device configures a first carrier and a second carrier, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth (Continued)

between the first carrier and the second carrier equals the available spectrum resource bandwidth.

18 Claims, 5 Drawing Sheets

(56) References Cited

U.S. PATENT DOCUMENTS

| | | | |
|---|---|---|---|
| 2018/0035458 A1 | 2/2018 | Islam et al. | |
| 2018/0192384 A1* | 7/2018 | Chou | H04W 76/27 |
| 2018/0331813 A1 | 11/2018 | Patel et al. | |
| 2019/0141742 A1* | 5/2019 | Zhou | H04L 5/0064 |
| 2019/0182000 A1* | 6/2019 | Futaki | H04L 5/0039 |
| 2019/0245737 A1* | 8/2019 | Zhou | H04B 7/06 |
| 2019/0246421 A1* | 8/2019 | Zhou | H04L 5/00 |
| 2019/0253949 A1* | 8/2019 | Park | H04W 76/19 |
| 2019/0261423 A1* | 8/2019 | Tsai | H04W 74/002 |
| 2019/0280843 A1 | 9/2019 | Jeon et al. | |
| 2019/0349867 A1* | 11/2019 | MolavianJazi | H04W 52/16 |
| 2019/0363846 A1* | 11/2019 | Lei | H04L 5/0014 |
| 2020/0053811 A1* | 2/2020 | Ang | H04W 74/0833 |
| 2020/0228966 A1* | 7/2020 | Xu | H04W 72/23 |
| 2020/0281022 A1* | 9/2020 | Pelletier | H04W 72/0453 |
| 2020/0344019 A1* | 10/2020 | Da Silva | H04W 24/10 |
| 2020/0404600 A1* | 12/2020 | Ly | H04L 5/0051 |
| 2021/0014893 A1* | 1/2021 | Park | H04W 80/08 |
| 2022/0174766 A1* | 6/2022 | Zhou | H04L 5/00 |
| 2022/0286929 A1* | 9/2022 | Park | H04W 36/0055 |
| 2024/0040598 A1* | 2/2024 | Islam | H04W 72/1273 |

FOREIGN PATENT DOCUMENTS

| | | |
|---|---|---|
| CN | 108633058 A | 10/2018 |
| CN | 109803426 A | 5/2019 |
| CN | 110177340 A | 8/2019 |
| WO | 2017071295 A1 | 5/2017 |
| WO | 2019097432 A1 | 5/2019 |
| WO | 2019097459 A1 | 5/2019 |
| WO | 2019138500 A1 | 7/2019 |

OTHER PUBLICATIONS

International Search Report issued in corresponding International Application No. PCT/CN2020/117770, dated Nov. 26, 2020, pp. 1-9.

Chinese Office Action issued in corresponding Chinese Application No. 201910964026.0, dated Jul. 29, 2022, pp. 1-7.

Ericsson, On Bandwidth Parts and Multiple SSBs.3GPP TSG-RAN WG2 #99bis, Prague, Czech Republic, 9th Oct. 13, 2017, R2-1711822, 6 pages.

Extended European Search Report issued in corresponding European Application No. 20874756.8, dated Oct. 11, 2022, pp. 1-10.

* cited by examiner

CARRIER CONFIGURATION METHOD AND RELATED APPARATUS

CROSS-REFERENCE TO RELATED APPLICATIONS

This application is a continuation of International Application No. PCT/CN2020/117770, filed on Sep. 25, 2020, which claims priority to Chinese Patent Application No. 201910964026.0, filed on Oct. 11, 2019. The disclosures of the aforementioned applications are hereby incorporated by reference in their entireties.

TECHNICAL FIELD

This application relates to the communication field, and in particular, to a carrier configuration method and a related apparatus.

BACKGROUND

With rapid development of communication technologies, a current communication trend is 5th generation mobile networks (5G). In the communication standard, a 5G communication network is a full spectrum access system, and spectrum application scenarios of the 5G communication network are as follows: A spectrum below 3 GHz has a strong coverage capability, and is used to construct a mobile basic coverage network; and a spectrum above 3 gigahertz (GHz) has abundant bandwidth resources, but has a weak coverage capability, and the spectrum may be used to meet hotspot coverage in dense urban areas and absorb a hot spot capacity. In addition, in 5G communication, to adapt to different frequency bands and services, a carrier bandwidth supports a plurality of forms: 10 M, 15 M, 20 M, 40 M, 50 M, 60 M, 80 M, 100 M, 200 M, and 400 M.

In the 5G communication, a larger subcarrier spacing and a larger carrier bandwidth may be used for a higher frequency band. This also causes a carrier aggregation (CA) capability of a mobile terminal of a user to become no longer important in an early stage of 5G.

This leads to a possibility that a terminal vendor produces a terminal device that does not support the CA capability. However, in the 5G communication, a spectrum bandwidth of an operator may be very large. In this case, how to fully use a resource of the operator is an urgent problem to be resolved.

SUMMARY

Embodiments of this application provide a carrier configuration method and a related apparatus, so that a terminal device can fully use a spectrum resource when the spectrum resource is greater than a maximum carrier bandwidth at a subcarrier spacing.

According to a first aspect, an embodiment of this application provides a carrier configuration method. A specific manner of the carrier configuration method includes: A radio access network device obtains an available spectrum resource bandwidth and a maximum carrier bandwidth at a subcarrier spacing in a current communication network. If the available spectrum resource bandwidth is greater than the maximum carrier bandwidth, the radio access network device configures a first carrier and a second carrier, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth.

It may be understood that specific bandwidths of the first carrier and the second carrier may be freely configured. For example, both the first carrier and the second carrier may be equal to the maximum carrier bandwidth. The specific bandwidths may also be configured in other manners, as long as the sum of the first carrier bandwidth and the second carrier bandwidth minus the overlapping bandwidth between the first carrier and the second carrier equals the available spectrum resource bandwidth.

In this embodiment, the radio access network device configures an available spectrum resource as two carriers that may overlap, and a sum of carrier bandwidths of the two carriers that may overlap minus an overlapping bandwidth equals the available spectrum resource. In this case, the radio access network device may notify a terminal device to use the two carriers, that is, the terminal device may fully use the available spectrum resource without being limited to the maximum carrier bandwidth at the subcarrier spacing.

Optionally, the radio access network device configures a synchronization signal block (SSB) on the first carrier, or configures an SSB on the second carrier. In other words, the radio access network device configures an SSB on either of the two carriers.

On this basis, the radio access network device sends, in a time division manner on the carrier on which the SSB is configured, SSB configuration information of the two carriers. A specific case is as follows:

In one case, if the SSB is configured on the first carrier, the radio access network device sends, within first duration by using the SSB, SSB configuration information corresponding to the first carrier, and sends, within second duration by using the SSB, SSB configuration information corresponding to the second carrier. The first duration plus the second duration is one periodicity duration.

In another case, if the SSB is configured on the first carrier, the radio access network device sends, within first duration by using the SSB, SSB configuration information corresponding to the second carrier, and sends, within second duration by using the SSB, SSB configuration information corresponding to the first carrier. The first duration plus the second duration is one periodicity duration.

In another case, if the SSB is configured on the second carrier, the radio access network device sends, within first duration by using the SSB, SSB configuration information corresponding to the second carrier, and sends, within second duration by using the SSB, SSB configuration information corresponding to the first carrier. The first duration plus the second duration is one periodicity duration.

In another case, if the SSB is configured on the second carrier, the radio access network device sends, within first duration by using the SSB, SSB configuration information corresponding to the first carrier, and sends, within second duration by using the SSB, SSB configuration information corresponding to the second carrier. The first duration plus the second duration is one periodicity duration.

In this embodiment, the first duration and the second duration may be set by the radio access network device. For example, assuming that a periodicity is 40 milliseconds, the first duration may be set to 20 milliseconds, and the second duration may be set to 20 milliseconds. In addition, overheads of one SSB can be reduced.

Optionally, the radio access network device configures an SSB on the first carrier, and configures an SSB on the second carrier at the same time. On this basis, the radio access network device sends, by using the SSB on the first carrier, SSB configuration information corresponding to the first carrier, and sends, by using the SSB on the second carrier, SSB configuration information corresponding to the second carrier. It may be understood that, in this embodiment, the radio access network device separately sends, within periodicity duration of the first carrier, the SSB configuration information corresponding to the first carrier, and sends, within periodicity duration of the second carrier, the SSB configuration information corresponding to the second carrier. In addition, the periodicity duration of the first carrier and the periodicity duration of the second carrier in this embodiment may be different, or may be the same. In this way, periodicity duration within which the radio access network device sends the SSB configuration information is correspondingly reduced, and a scheduling speed is accelerated.

Optionally, in the foregoing two solutions, there is the overlapping bandwidth between the first carrier and the second carrier. If the terminal device sends data on both the first carrier and the second carrier, the radio access network device indicates the terminal device to transmit the data by using a space division technology on the overlapping bandwidth part. For example, if a terminal device 1 transmits data on a bandwidth A of the first carrier, and a terminal device 2 transmits data on a bandwidth A of the second carrier, the radio access network device may notify the terminal device 1 and the terminal device 2 to separately transmit data by using different ports. This can effectively improve a data transmission capacity of a communication system.

Optionally, the radio access network device configures an SSB on either of the two carriers, where the carrier on which the SSB is configured is used as a primary component carrier, and the other carrier is used as a secondary component carrier. A specific case is as follows: The radio access network device configures that the first carrier includes an SSB, the first carrier is used as a primary component carrier, and the second carrier is used as a secondary component carrier of the first carrier; or the radio access network device configures that the second carrier includes an SSB, the second carrier is used as a primary component carrier, and the first carrier is used as a secondary component carrier of the second carrier.

Based on this solution, the radio access network device sends, on the primary component carrier, SSB configuration information corresponding to the primary component carrier. In this embodiment, if the terminal device transmits data on the secondary component carrier, the radio access network device activates the secondary component carrier by using the primary component carrier, and indicates the terminal device to transmit the data on a bandwidth of a part of the secondary component carrier that does not overlap the primary component carrier.

According to a second aspect, an embodiment of this application describes a carrier configuration method from a perspective of a terminal device. The method includes: The terminal device receives carrier configuration information, where the carrier configuration information includes configuration information of a first carrier and/or configuration information of a second carrier. The first carrier and the second carrier are configured by a radio access network device after the radio access network device obtains an available spectrum resource bandwidth and a maximum carrier bandwidth at a subcarrier spacing, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth. Then, the terminal device selects a corresponding carrier based on the carrier configuration information to send data to the radio access network device.

It may be understood that specific bandwidths of the first carrier and the second carrier may be freely configured. For example, both the first carrier and the second carrier may be equal to the maximum carrier bandwidth. The specific bandwidths may also be configured in other manners, as long as the sum of the first carrier bandwidth and the second carrier bandwidth minus the overlapping bandwidth between the first carrier and the second carrier equals the available spectrum resource bandwidth.

In this embodiment, the radio access network device configures an available spectrum resource as two carriers that may overlap, and a sum of carrier bandwidths of the two carriers that may overlap minus an overlapping bandwidth equals the available spectrum resource. In this case, the radio access network device may notify the terminal device to use at least one of the two carriers, that is, the terminal device may fully use the available spectrum resource without being limited to the maximum carrier bandwidth at the subcarrier spacing.

Optionally, a synchronization signal block (SSB) is configured on the first carrier, or an SSB is configured on the second carrier. In other words, the radio access network device configures an SSB on either of the two carriers.

On this basis, the radio access network device sends, in a time division manner on the carrier on which the SSB is configured, SSB configuration information of the two carriers. A specific case is as follows:

In one case, if the SSB is configured on the first carrier, the terminal device receives, within first duration, SSB configuration information corresponding to the first carrier and sent by the radio access network device by using the SSB, and/or the terminal device receives, within second duration, SSB configuration information corresponding to the second carrier and sent by the radio access network device by using the SSB. The first duration plus the second duration is one periodicity duration.

In another case, if the SSB is configured on the first carrier, the terminal device receives, within first duration, SSB configuration information corresponding to the second carrier and sent by the radio access network device by using the SSB, and/or the terminal device receives, within second duration, SSB configuration information corresponding to the first carrier and sent by the radio access network device by using the SSB. The first duration plus the second duration is one periodicity duration.

In another case, if the SSB is configured on the second carrier, the terminal device receives, within first duration, SSB configuration information corresponding to the second carrier and sent by the radio access network device by using the SSB within the first duration, and/or the terminal device receives, within second duration, SSB configuration information corresponding to the first carrier and sent by the radio access network device by using the SSB. The first duration plus the second duration is one periodicity duration.

In another case, if the SSB is configured on the second carrier, the terminal device receives, within first duration, SSB configuration information corresponding to the first carrier and sent by the radio access network device by using the SSB, and/or the terminal device receives, within second duration, SSB configuration information corresponding to the second carrier and sent by the radio access network device by using the SSB. The first duration plus the second duration is one periodicity duration.

In this embodiment, the first duration and the second duration may be set by the radio access network device. For example, assuming that a periodicity is 40 milliseconds, the first duration may be set to 20 milliseconds, and the second duration may be set to 20 milliseconds. In addition, overheads of one SSB can be reduced.

Optionally, an SSB is configured on the first carrier, and an SSB is configured on the second carrier. On this basis, the terminal device receives SSB configuration information corresponding to the first carrier and sent by the radio access network device by using the SSB on the first carrier, and/or the terminal device receives SSB configuration information corresponding to the second carrier and sent by the radio access network device by using the SSB on the second carrier. It may be understood that, in this embodiment, the radio access network device separately sends, within periodicity duration of the first carrier, the SSB configuration information corresponding to the first carrier, and sends, within periodicity duration of the second carrier, the SSB configuration information corresponding to the second carrier. In addition, the periodicity duration of the first carrier and the periodicity duration of the second carrier in this embodiment may be different, or may be the same. In this way, periodicity duration within which the radio access network device sends the SSB configuration information is correspondingly reduced, and a scheduling speed is accelerated.

Optionally, in the foregoing two solutions, there is the overlapping bandwidth between the first carrier and the second carrier. If the terminal device sends data on both the first carrier and the second carrier, the radio access network device indicates the terminal device to transmit the data by using a space division technology on the overlapping bandwidth part. For example, if a terminal device 1 transmits data on a bandwidth A of the first carrier, and a terminal device 2 transmits data on a bandwidth A of the second carrier, the radio access network device may notify the terminal device 1 and the terminal device 2 to separately transmit data by using different ports. This can effectively improve a data transmission capacity of a communication system.

Optionally, the radio access network device configures an SSB on either of the two carriers, where the carrier on which the SSB is configured is used as a primary component carrier, and the other carrier is used as a secondary component carrier. A specific case is as follows: The radio access network device configures that the first carrier includes an SSB, the first carrier is used as a primary component carrier, and the second carrier is used as a secondary component carrier of the first carrier; or the radio access network device configures that the second carrier includes an SSB, the second carrier is used as a primary component carrier, and the first carrier is used as a secondary component carrier of the second carrier.

Based on this solution, the radio access network device sends, on the primary component carrier, SSB configuration information corresponding to the primary component carrier. In this embodiment, if the terminal device transmits data on the secondary component carrier, the radio access network device activates the secondary component carrier by using the primary component carrier, and indicates the terminal device to transmit the data on a bandwidth of a part of the secondary component carrier that does not overlap the primary component carrier.

According to a third aspect, an embodiment of this application provides a carrier configuration apparatus. The apparatus has a function for implementing behavior of the radio access network device in the foregoing first aspect. The function may be implemented by hardware, or may be implemented by hardware executing corresponding software. The hardware or the software includes one or more modules corresponding to the foregoing function.

In a possible implementation, the apparatus includes units or modules configured to perform the steps according to the foregoing first aspect. For example, the apparatus includes: an obtaining module, configured to obtain an available spectrum resource bandwidth and a maximum carrier bandwidth at a subcarrier spacing; a processing module, configured to configure a first carrier and a second carrier, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth; a sending module, configured to send carrier configuration information to a terminal device, where the carrier configuration information includes first carrier information and second carrier information; and a receiving module, configured to receive data sent by the terminal device based on the carrier configuration information.

Optionally, the apparatus further includes a storage module, configured to store program instructions and data that are necessary for the radio access network device.

In a possible implementation, the apparatus includes: a processor and a transceiver. The processor is configured to support the radio access network device in performing a corresponding function in the method according to the foregoing first aspect. The transceiver is configured to indicate communication between the radio access network device and a terminal device, and send the information or the instructions in the foregoing method to the terminal device. Optionally, the apparatus may further include a memory. The memory is configured to be coupled to the processor, and the memory stores program instructions and data that are necessary for the radio access network device.

In a possible implementation, when the apparatus is a chip in the radio access network device, the chip includes: a processing module and a transceiver module. The transceiver module may be, for example, an input/output interface, a pin, or a circuit on the chip. The transceiver module is configured to obtain an available spectrum resource bandwidth and a maximum carrier bandwidth at a subcarrier spacing. The processing module may be, for example, a processor. The processor is configured to configure a first carrier and a second carrier, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth. The processing module may execute computer-executable instructions stored in a storage unit, to support the radio access network device in performing the method according to the foregoing first aspect. Optionally, the storage unit may be a storage unit in the chip, such as a register or a cache. The storage unit may alternatively be a storage unit that is located outside the chip, such as a read-only memory (ROM), another type of static storage device that can store static information and instructions, or a random access memory (RAM).

In a possible implementation, the apparatus includes: a processor, a baseband circuit, a radio frequency circuit, and an antenna. The processor is configured to implement control of functions of various circuit parts. The baseband circuit is configured to perform carrier configuration and generate carrier configuration information. After the radio frequency circuit processes the carrier configuration information by performing analog conversion, filtering, amplification, up-conversion, and the like, the carrier configuration information is sent to a terminal device via the antenna. Optionally, the apparatus further includes a memory, and the memory stores program instructions and data that are necessary for the carrier configuration apparatus.

The processor mentioned anywhere above may be a general-purpose central processing unit (CPU), a microprocessor, an application-specific integrated circuit (ASIC), or one or more integrated circuits configured to control program execution of the carrier configuration methods in the foregoing aspects.

According to a fourth aspect, an embodiment of this application provides a communication apparatus on a terminal side. The apparatus has a function for implementing behavior of the terminal device in the foregoing second aspect. The function may be implemented by hardware, or may be implemented by hardware executing corresponding software. The hardware or the software includes one or more modules corresponding to the foregoing function.

In a possible implementation, the terminal includes units or modules configured to perform the steps in the second aspect. For example, the terminal includes: a receiving module, configured to receive carrier configuration information, where the carrier configuration information includes configuration information of a first carrier and configuration information of a second carrier. The first carrier and the second carrier are configured by a radio access network device after the radio access network device obtains an available spectrum resource bandwidth and a maximum carrier bandwidth at a subcarrier spacing, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth; and a sending module, configured to select a corresponding carrier based on the carrier configuration information to send data to the radio access network device.

Optionally, the terminal further includes a storage module, configured to store program instructions and data that are necessary for the terminal device.

Optionally, the terminal further includes a processing module, configured to invoke the program instructions in the storage module to complete the steps in the second aspect.

In a possible implementation, the terminal device includes: a processor and a transceiver. The processor is configured to support the terminal device in performing corresponding functions in the method according to the foregoing second aspect. The transceiver is configured to indicate communication between a radio access network device and the terminal device, and send the information or the instructions in the foregoing method to the radio access network device. Optionally, the terminal device may further include a memory. The memory is configured to be coupled to the processor, and the memory stores program instructions and data that are necessary for the terminal device.

In a possible implementation, when the apparatus is a chip in the terminal device, the chip includes: a processing module and a transceiver module. The transceiver module may be, for example, an input/output interface, a pin, or a circuit on the chip. The transceiver module is configured to receive carrier configuration information. The processing module may be, for example, a processor. The processing module may execute computer-executable instructions stored in a storage unit, to support the terminal device in performing the method according to the foregoing second aspect. Optionally, the storage unit may be a storage unit in the chip, such as a register or a cache. The storage unit may alternatively be a storage unit that is located outside the chip, such as a read-only memory (ROM), another type of static storage device that can store static information and instructions, or a random access memory (RAM).

In a possible implementation, the apparatus includes: a processor, a baseband circuit, a radio frequency circuit, and an antenna. The processor is configured to implement control of functions of various circuit parts. The baseband circuit is configured to generate data. After the radio frequency circuit processes the data by performing analog conversion, filtering, amplification, up-conversion, and the like, the data is sent to a radio access network device via the antenna. Optionally, the apparatus further includes a memory, and the memory stores program instructions and data that are necessary for the terminal device.

The processor mentioned anywhere above may be a general-purpose central processing unit (CPU), a microprocessor, an application-specific integrated circuit (ASIC), or one or more integrated circuits configured to control program execution of the carrier configuration method in the foregoing aspects.

According to a fifth aspect, an embodiment of this application provides a computer-readable storage medium, where the computer storage medium stores computer instructions, and the computer instructions are used to perform the method according to any one of the possible implementations of the foregoing first aspect or the second aspect.

According to a sixth aspect, an embodiment of this application provides a computer program product including instructions, where when the computer program product runs on a computer, the computer is enabled to perform the methods according to any one of the foregoing aspects.

According to a seventh aspect, this application provides a chip system, where the chip system includes a processor, configured to support a radio access network device in implementing functions in the foregoing aspects, for example, generating or processing data and/or information in the foregoing methods. In a possible design, the chip system further includes a memory. The memory is configured to store program instructions and data that are necessary for the radio access network device, to implement functions in any one of the foregoing aspects. The chip system may include a chip, or may include the chip and another discrete component.

According to an eighth aspect, an embodiment of this application provides a communication system, where the system includes the radio access network device and the terminal device according to the foregoing aspects.

From the foregoing technical solutions, it can be learned that embodiments of this application have the following advantages: The radio access network device configures the available spectrum resource as the two carriers that may overlap, and the sum of the carrier bandwidths of the two carriers that may overlap minus the overlapping bandwidth equals the available spectrum resource. In this case, the radio access network device may notify the terminal device to use the two carriers, that is, the terminal device may fully use the available spectrum resource without being limited to the maximum carrier bandwidth at the subcarrier spacing.

DESCRIPTION OF EMBODIMENTS

Figure 1:
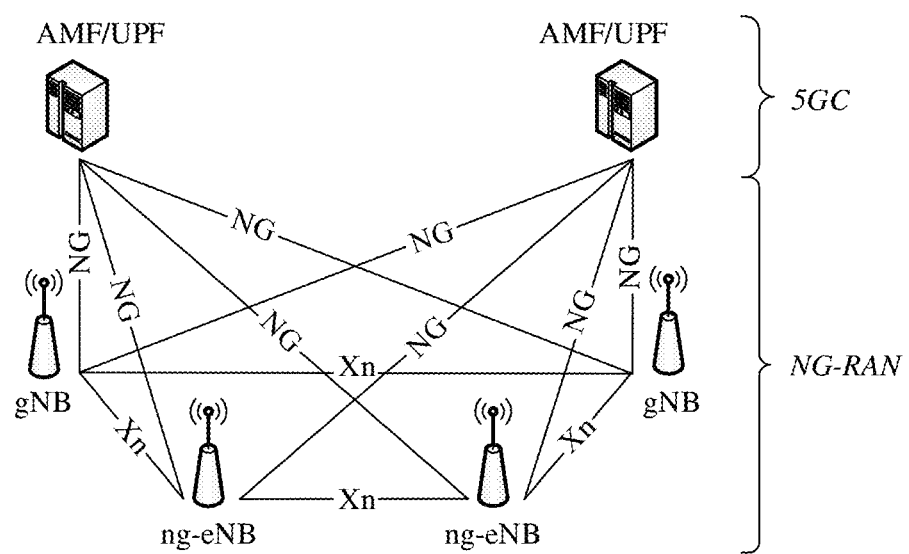
FIG. 1 is a schematic diagram of a system architecture according to an embodiment of this application.

Embodiments of this application provide a carrier configuration method and a related apparatus, so that a terminal device can fully use a spectrum resource when the spectrum resource is greater than a maximum carrier bandwidth at a subcarrier spacing.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way is interchangeable in proper circumstances so that embodiments described herein can be implemented in orders other than the order illustrated or described herein. Moreover, the terms "include", "contain", and any variant thereof mean to cover non-exclusive inclusion, for example, a process, a method, a system, a product, or a device that includes a list of steps or units is not necessarily limited to those steps or units that are expressly listed, but may include other steps or units that are not expressly listed or inherent to such a process, a method, a product, or a device.

With rapid development of communication technologies, a current communication trend is 5G. In the communication standard, a 5G communication network is a full spectrum access system, and spectrum application scenarios of the 5G communication network are as follows: A spectrum below 3 GHz has a strong coverage capability, and is used to construct a mobile basic coverage network; and a spectrum above 3 GHz has abundant bandwidth resources, but has a weak coverage capability, and the spectrum may be used to meet hotspot coverage in dense urban areas and absorb a hot spot capacity. In addition, in 5G communication, to adapt to different frequency bands and services, a carrier bandwidth supports a plurality of forms: 10 M, 15 M, 20 M, 40 M, 50 M, 60 M, 80 M, 100 M, 200 M, and 400 M. In the 5G communication, a larger subcarrier spacing and a larger carrier bandwidth may be used for a higher frequency band. This also causes a CA capability of a mobile terminal of a user to become no longer important in an early stage of 5G. This leads to a possibility that a terminal vendor produces a terminal device that does not support the CA capability. However, in the 5G communication, a spectrum bandwidth of an operator may be very large. In this case, how to fully use a resource of the operator is an urgent problem to be resolved.

To resolve the problem, embodiments of this application provide the following technical solution: A radio access network device obtains an available spectrum resource bandwidth and a maximum carrier bandwidth at a subcarrier spacing in a current communication network. If the available spectrum resource bandwidth is greater than the maximum carrier bandwidth, the radio access network device configures a first carrier and a second carrier for a terminal device, where a sum of a first carrier bandwidth of the first carrier and a second carrier bandwidth of the second carrier is greater than the available spectrum resource bandwidth. In addition, the sum of the first carrier bandwidth and the second carrier bandwidth minus an overlapping bandwidth between the first carrier and the second carrier equals the available spectrum resource bandwidth. Then, the radio access network device sends carrier configuration information to the terminal device, where the carrier configuration information includes configuration information of the first carrier and configuration information of the second carrier. Finally, the radio access network device receives data sent by the terminal device by using the carrier configuration information.

It may be understood that an example solution of an application system architecture in an embodiment of this application may be shown in FIG. 1. In the system architecture, an NG-RAN represents a radio access network, and a 5GC represents a core network. In the NG-RAN, there are two types of nodes: One is a gNB, configured to provide a new radio NR user plane and control plane protocols and functions; and the other one is an ng-eNB, configured to provide an E-UTRA user plane and control plane protocols and functions. The gNB is connected to the ng-eNB through an Xn interface. The gNB/ng-eNB is connected to an access and mobility management function (AMF) of a control plane through an NG-C interface, and is connected to a user plane function (UPF) through an NG-U interface.

A person skilled in the art may understand that the terminal in this application may be various user terminals, user apparatuses, access apparatuses, subscriber stations, subscriber units, mobile stations, user agents, user equipment, or other names that have a wireless communication function. The user terminal may include various handheld devices, vehicle-mounted devices, wearable devices, computing devices, or other processing devices connected to wireless modems that have a wireless communication function, and various forms of user equipment (UE), mobile stations (MS), terminals, terminal devices (Terminal Equipment), portable communication devices, hand-held phones, portable computing devices, entertainment devices, game devices or systems, global positioning system devices, any other suitable devices configured to perform network communication via wireless media, or the like.

The radio access network device in embodiments of this application is an entity used to send or receive a signal in a radio access network, and may be specifically a base station or another device. The base station may be a global system for mobile communications (GSM) system, a base transceiver station (BTS) in a code division multiple access (CDMA) system, a NodeB in a wideband code division multiple access (WCDMA) system, an evolved NodeB (eNB or e-NodeB) in LTE, or a base station in a 5th generation mobile networks (5G) system, another new radio access network (NR) system, or a subsequently evolved communication system. This is not specifically limited in embodiments of this application.

Figure 2:
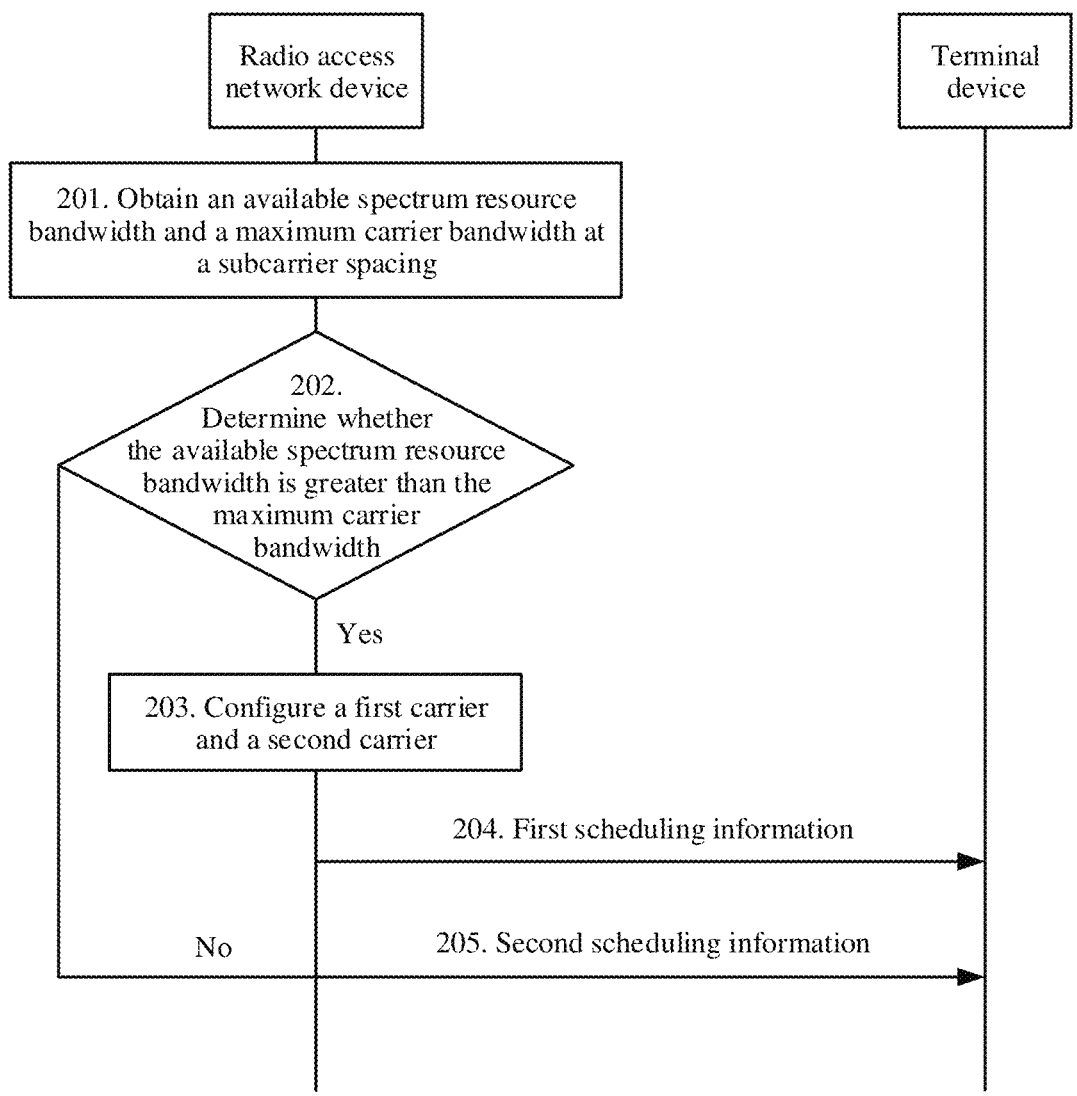
FIG. 2 is a schematic diagram of an embodiment of a carrier configuration method according to an embodiment of this application.

For details, refer to FIG. 2. An embodiment of a carrier configuration method in embodiments of this application includes the following steps.

201. A radio access network device obtains an available spectrum resource bandwidth and a maximum carrier bandwidth at a subcarrier spacing.

Figure 3:
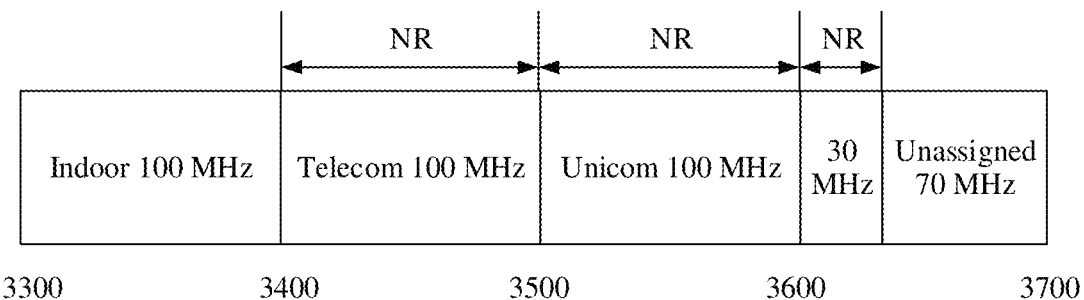
FIG. 3 is a schematic diagram of an available spectrum resource bandwidth and a maximum carrier bandwidth according to an embodiment of this application.

The radio access network device obtains an available spectrum resource bandwidth of a network operator to which a terminal device belongs and a maximum carrier bandwidth supported by a current communication network. In this embodiment, in an early stage of 5G, available spectrum resource bandwidths of network operators may be shown in FIG. 3. Unicom is used as an example for description, and the Unicom obtains a carrier resource of 130 MHz. However, in a current NR protocol, a maximum carrier bandwidth at a subcarrier spacing of 30 kHz is 100 MHz.

202. The radio access network device determines whether the available spectrum resource bandwidth is greater than the maximum carrier bandwidth. If the available spectrum resource bandwidth is greater than the maximum carrier bandwidth, perform step 203 and step 204; or if the available spectrum resource bandwidth is less than the maximum carrier bandwidth, perform step 205.

If the radio access network device determines that the available spectrum resource bandwidth is greater than the maximum carrier bandwidth, the radio access network device reconfigures the available spectrum resource bandwidth for the terminal device. Therefore perform step 203 and step 204. If the radio access network device determines that the available spectrum resource bandwidth is less than or equal to the maximum carrier bandwidth, the radio access network device may schedule an available spectrum resource for the terminal device according to a current carrier configuration method. Therefore perform step 205.

203. The radio access network device configures a first carrier and a second carrier, where a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth.

The radio access network device may configure the first carrier and the second carrier in the following specific manners:

In a possible implementation, the radio access network device configures a synchronization signal block (SSB) on the first carrier, or configures an SSB on the second carrier. In other words, the radio access network device configures an SSB on either of the two carriers.

On this basis, the radio access network device sends, in a time division manner on the carrier on which the SSB is configured, SSB configuration information of the two carriers. A specific case is as follows:

In one case, if the SSB is configured on the first carrier, the radio access network device sends, within first duration by using the SSB, SSB configuration information corresponding to the first carrier, and sends, within second duration by using the SSB, SSB configuration information corresponding to the second carrier. The first duration plus the second duration is one periodicity duration.

In another case, if the SSB is configured on the first carrier, the radio access network device sends, within first duration by using the SSB, SSB configuration information corresponding to the second carrier, and sends, within second duration by using the SSB, SSB configuration information corresponding to the first carrier. The first duration plus the second duration is one periodicity duration.

In another case, if the SSB is configured on the second carrier, the radio access network device sends, within first duration by using the SSB, SSB configuration information corresponding to the second carrier, and sends, within second duration by using the SSB, SSB configuration information corresponding to the first carrier. The first duration plus the second duration is one periodicity duration.

In another case, if the SSB is configured on the second carrier, the radio access network device sends, within first duration by using the SSB, SSB configuration information corresponding to the first carrier, and sends, within second duration by using the SSB, SSB configuration information corresponding to the second carrier. The first duration plus the second duration is one periodicity duration.

Figure 4:
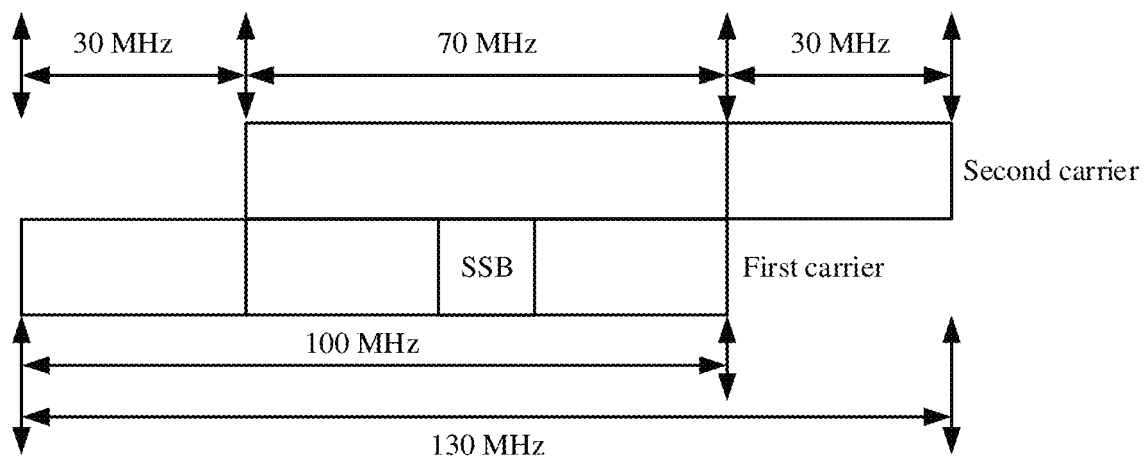
FIG. 4 is a schematic diagram of a configuration of a first carrier and a second carrier according to an embodiment of this application.

In this embodiment, the first duration and the second duration may be set by the radio access network device. For example, assuming that a periodicity is 40 milliseconds, the first duration may be set to 20 milliseconds, and the second duration may be set to 20 milliseconds. In addition, overheads of one SSB can be reduced. An example solution of the carrier configuration may be shown in FIG. 4. The available spectrum resource bandwidth is 130 MHz, the first carrier bandwidth of the first carrier is 100 MHz, and the second carrier bandwidth of the second carrier is 100 MHz. As shown in FIG. 4, the overlapping bandwidth between the first carrier and the second carrier is 70 MHz, and non-overlapping bandwidths are 30 MHz and 30 MHz. The SSB is configured on the first carrier. Then the radio access network device may send the SSB configuration information of the first carrier and the SSB configuration information of the second carrier to the terminal device by using the SSB on the first carrier.

In another possible implementation, the radio access network device configures an SSB on the first carrier, and configures an SSB on the second carrier. On this basis, the radio access network device sends, by using the SSB on the first carrier, SSB configuration information corresponding to the first carrier, and sends, by using the SSB on the second carrier, SSB configuration information corresponding to the second carrier. It may be understood that, in this embodiment, the radio access network device separately sends, within periodicity duration of the first carrier, the SSB configuration information corresponding to the first carrier, and sends, within periodicity duration of the second carrier, the SSB configuration information corresponding to the second carrier. In addition, the periodicity duration of the first carrier and the periodicity duration of the second carrier in this embodiment may be different, or may be the same. In this way, periodicity duration within which the radio access network device sends the SSB configuration information is correspondingly reduced, and a scheduling speed is accelerated. An example solution of the carrier configuration may be shown in FIG. 5. The available spectrum resource bandwidth is 130 MHz, the first carrier bandwidth of the first carrier is 100 MHz, and the second carrier bandwidth of the second carrier is 100 MHz. As shown in FIG. 4, the overlapping bandwidth between the first carrier and the second carrier is 70 MHz, and non-overlapping bandwidths are 30 MHz and 30 MHz. The SSB is configured on the first carrier, and the SSB is configured on the second carrier. The radio access network device may send the SSB configuration information of the first carrier to the terminal device by using the SSB on the first carrier, and send the SSB configuration information of the second carrier to the terminal device by using the SSB on the second carrier.

Figure 5:
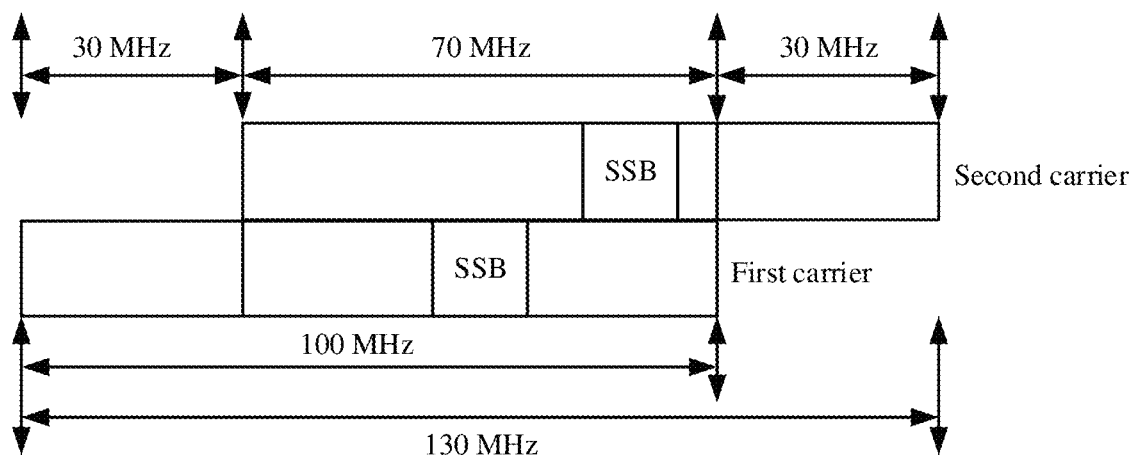
FIG. 5 is a schematic diagram of another configuration of a first carrier and a second carrier according to an embodiment of this application.

Optionally, in the foregoing two solutions, there is the overlapping bandwidth between the first carrier and the second carrier. If the terminal device sends data on both the first carrier and the second carrier, the radio access network device indicates the terminal device to transmit the data by using a space division technology on the overlapping bandwidth part. For example, as shown in FIG. 4 or FIG. 5, if a terminal device 1 transmits data on a bandwidth of 75 MHz of the first carrier, and a terminal device 2 transmits data on a bandwidth of 75 MHz of the second carrier, the radio access network device may notify the terminal device 1 and the terminal device 2 to separately transmit data by using different ports. This can effectively improve a data transmission capacity of a communication system.

In another possible implementation, the radio access network device configures an SSB on either of the two carriers, where the carrier on which the SSB is configured is used as a primary component carrier, and the other carrier is used as a secondary component carrier. A specific case is as follows: The radio access network device configures that the first carrier includes an SSB, the first carrier is used as a primary component carrier, and the second carrier is used as a secondary component carrier of the first carrier; or the radio access network device configures that the second carrier includes an SSB, the second carrier is used as a primary component carrier, and the first carrier is used as a secondary component carrier of the second carrier.

Figure 6:
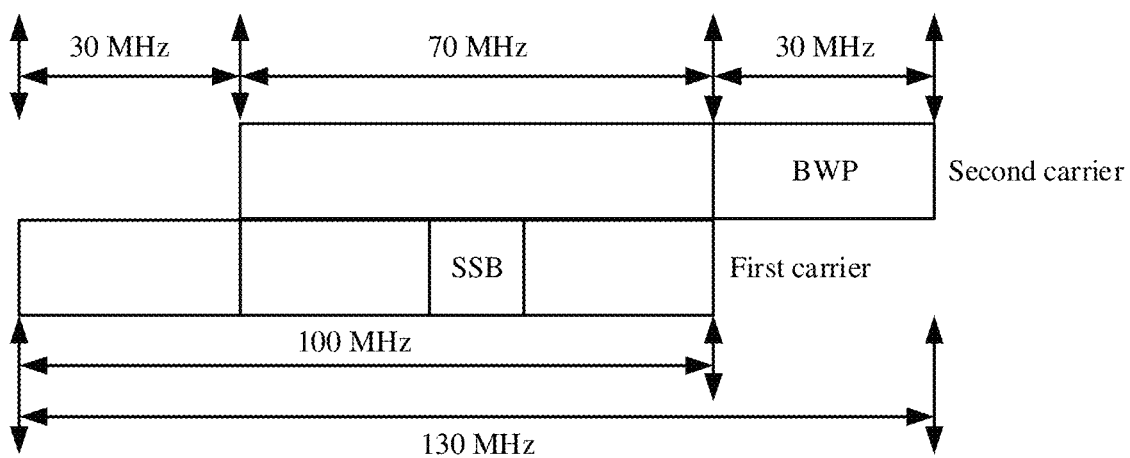
FIG. 6 is a schematic diagram of another configuration of a first carrier and a second carrier according to an embodiment of this application.

Based on this solution, the radio access network device sends, on the primary component carrier, SSB configuration information corresponding to the primary component carrier. In this embodiment, if the terminal device transmits data on the secondary component carrier, the radio access network device activates the secondary component carrier by using the primary component carrier, and indicates the terminal device to transmit the data on a bandwidth of a part of the secondary component carrier that does not overlap the primary component carrier. Specifically, the radio access network device limits a bandwidth range of the terminal device on the secondary component carrier by using a bandwidth part (BWP) technology. An example solution of the carrier configuration may be shown in FIG. 6. The available spectrum resource bandwidth is 130 MHz, the first carrier bandwidth of the first carrier is 100 M, and the second carrier bandwidth of the second carrier is 100 MHz. As shown in FIG. 6, the overlapping bandwidth between the first carrier and the second carrier is 70 M, and non-overlapping bandwidths are 30 MHz and 30 MHz. The SSB is configured on the first carrier, that is, the first carrier is the primary component carrier, and the second carrier is the secondary component carrier of the first carrier. The radio access network device may send SSB configuration information of the first carrier to the terminal device by using the SSB on the first carrier. When the first carrier cannot meet data transmission of the terminal device, the radio access network device activates the second carrier by using the first carrier, and invokes a bandwidth (a BWP) of a part of the second carrier that does not overlap the first carrier for data transmission of the terminal device.

204. The radio access network sends first scheduling information to the terminal device, where the scheduling information is used to indicate the terminal device to transmit data by using the first carrier or the second carrier.

The radio access network device sends the scheduling information to the terminal device based on an actual application case in a data transmission process, and the scheduling information is used to indicate the terminal device to transmit the data by using the first carrier or the second carrier.

205. The radio access network device sends second scheduling information to the terminal device, where the scheduling information is used to indicate the terminal device to transmit data by using the available spectrum resource bandwidth.

In this embodiment, when the available spectrum resource bandwidth is greater than the maximum carrier bandwidth, the radio access network device configures the available spectrum resource as two carriers that may overlap, and a sum of carrier bandwidths of the two carriers that may overlap minus an overlapping bandwidth equals the available spectrum resource. In this case, the radio access network device may notify the terminal device to use the two carriers, that is, the terminal device may fully use the available spectrum resource without being limited to the maximum carrier bandwidth at the subcarrier spacing.

The foregoing describes the data transmission method in embodiments of this application, and the following describes a network device and a terminal in embodiments of this application.

Figure 7:
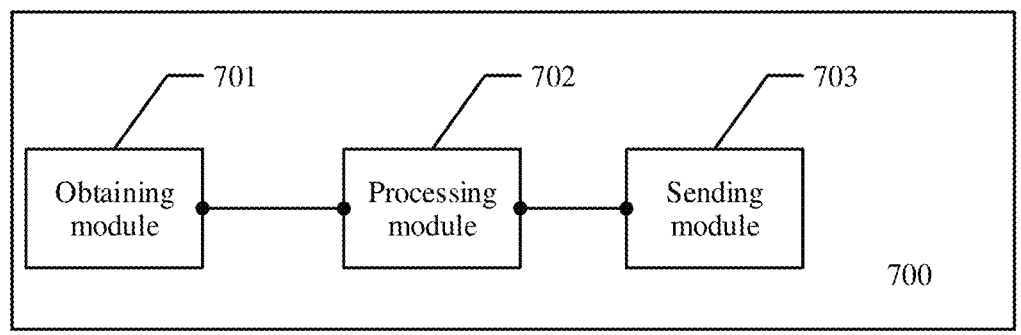
FIG. 7 is a schematic diagram of an embodiment of a carrier configuration apparatus according to an embodiment of this application.

For details, refer to FIG. 7, a carrier configuration 700 in an embodiment of this application includes: an obtaining module 701 and a processing module 702. The apparatus 700 may be the radio access network device in the foregoing method embodiment, or may be one or more chips in the radio access network device. The apparatus 700 may be configured to perform some or all functions of the radio access network device in the foregoing method embodiment.

For example, the processing module 702 may be configured to perform step 202 or step 203 in the foregoing method embodiment. For example, when the processing module 701 determines that the available spectrum resource bandwidth is greater than the maximum carrier bandwidth, the radio access network device configures the first carrier and the second carrier, where the sum of the first carrier bandwidth of the first carrier and the second carrier bandwidth of the second carrier is greater than the available spectrum resource bandwidth, and the sum of the first carrier bandwidth and the second carrier bandwidth minus the overlapping bandwidth between the first carrier and the second carrier equals the available spectrum resource bandwidth. The obtaining module 701 may be configured to perform step 201 in the foregoing method embodiment.

Optionally, the obtaining module 701 is further configured to receive uplink data sent by a terminal device.

Optionally, the apparatus 700 further includes a sending module 703. The sending module 703 is configured to send corresponding configuration information, scheduling information, or other signaling to the terminal device. The sending module 703 may be configured to perform step 204 or step 205 in the foregoing methods.

Optionally, the apparatus 700 further includes a storage module. The storage module is coupled to the processing module, so that the processing module can execute computer-executable instructions stored in the storage module, to implement functions of the radio access network device in the foregoing method embodiment. In an example, the storage module optionally included in the apparatus 700 may be a storage unit in a chip, such as a register or a cache. The storage module may alternatively be a storage unit that is located outside a chip, such as a read-only memory (ROMt), another type of static storage device that can store static information and instructions, or a random access memory (RAM). It should be understood that a procedure performed between the modules of the radio access network device in the corresponding embodiment in FIG. 7 is similar to the procedure performed by the radio access network device in the corresponding method embodiment in FIG. 2. Details are not described herein again.

Figure 8:
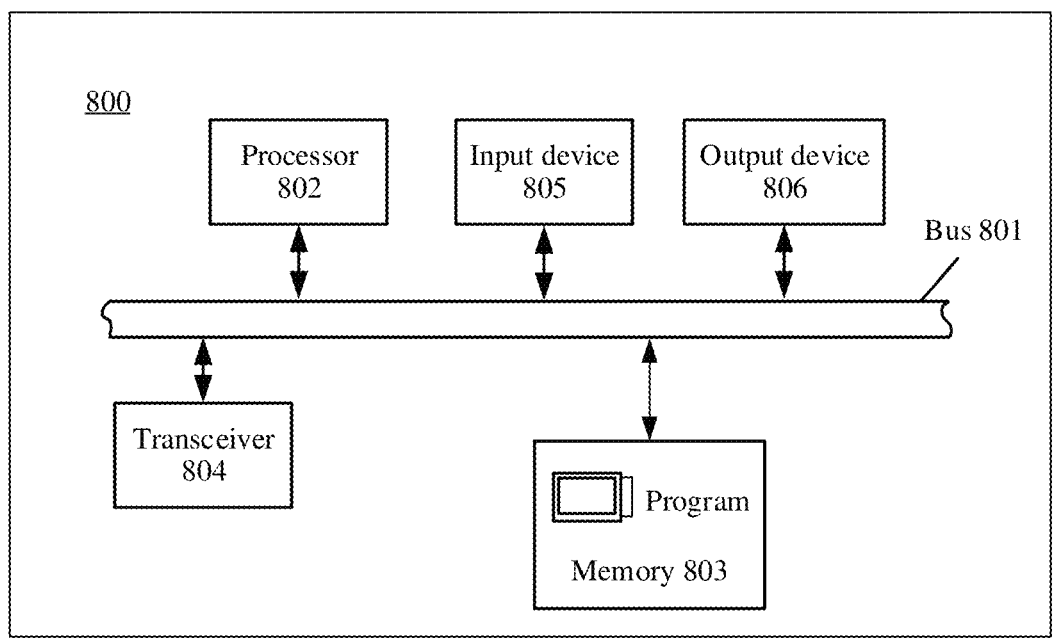
FIG. 8 is a schematic diagram of another embodiment of a carrier configuration apparatus according to an embodiment of this application.

FIG. 8 is a possible schematic diagram of a structure of a carrier configuration apparatus 800 in the foregoing embodiment. The apparatus 800 may be configured as the foregoing radio access network device. The apparatus 800 may include: a processor 802, a computer-readable storage medium/memory 803, a transceiver 804, an input device 805, an output device 806, and a bus 801. The processor, the transceiver, the computer-readable storage medium, and the like are connected through the bus. A specific connection medium between the foregoing components is not limited in this embodiment of this application.

In an example, when determining that the available spectrum resource bandwidth is greater than the maximum carrier bandwidth, the processor 802 configures the first carrier and the second carrier, where the sum of the first carrier bandwidth of the first carrier and the second carrier bandwidth of the second carrier is greater than the available spectrum resource bandwidth, and the sum of the first carrier bandwidth and the second carrier bandwidth minus the overlapping bandwidth between the first carrier and the second carrier equals the available spectrum resource bandwidth.

The transceiver 804 sends carrier configuration information or receives uplink data sent by a terminal device.

In an example, the processor 802 may include a baseband circuit. The transceiver 804 may include a radio frequency circuit, to perform processing such as modulation and amplification on the carrier configuration information or the SSB configuration information, and then send the carrier configuration information or the SSB configuration information to the terminal device.

In another example, the processor 802 may run an operating system to control a function between each device and each component. The transceiver 804 may include a baseband circuit and a radio frequency circuit. For example, carrier configuration information can be generated and processed by using the baseband circuit and the radio frequency circuit, and then be sent to the terminal device.

The transceiver 804 and the processor 802 may implement corresponding steps in FIG. 2. Details are not described herein again.

It may be understood that FIG. 8 only shows a simplified design of the radio access network device. In an actual application, the radio access network device may include any quantity of transceivers, processors, memories, and the like, and all radio access network devices that can implement this application fall within the protection scope of this application.

The processor 802 in the apparatus 800 may be a general-purpose processor, such as a general-purpose central processing unit, a network processor (NP), or a microprocessor, or may be an application-specific integrated circuit (ASIC), or one or more integrated circuits used to control program execution in the solutions of this application. Alternatively, the processor 802 may be a digital signal processor (DSP), a field-programmable gate array (FPGA) or other programmable logic devices, a discrete gate, a transistor logic device, or a discrete hardware component. Alternatively, a controller/processor may be a combination for implementing a computing function, such as a combination of one or more microprocessors, or a combination of a DSP and a microprocessor. The processor usually performs logical and arithmetic operations according to program instructions stored in the memory.

The bus 801 above may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 8, but this does not mean that there is only one bus or only one type of bus.

The computer-readable storage medium/memory 803 may further store an operating system and other application programs. Specifically, the program may include program code, and the program code includes computer operation instructions. More specifically, the foregoing memory may be a read-only memory (ROM), another type of static storage device that can store static information and instructions, a random access memory (RAM), another type of dynamic storage device that can store information and instructions, a magnetic disk memory, or the like. The memory 803 may be a combination of the foregoing storage types. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes: one or more microprocessors that provide a processor function and an external memory that provides at least a part of a storage medium. All these components are connected to other supporting circuits by using an external bus architecture. When the instructions stored in the memory are executed by a processor, the processor is enabled to perform some or all steps of the radio access network device in the carrier configuration method in the embodiment shown in FIG. 2, for example, step 202 and step 203 in FIG. 2, and/or other processes used for the technology described in this application.

Method or algorithm steps described in combination with the content disclosed in this application may be implemented by hardware, or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information to the storage medium. Certainly, the storage medium may be a component of the processor. The processor and the storage medium may be located in an ASIC. Additionally, the ASIC may be located in the radio access network device. Certainly, the processor and the storage medium may exist in the radio access network device as discrete components.

In this embodiment, when the available spectrum resource bandwidth is greater than the maximum carrier bandwidth, the radio access network device configures the available spectrum resource as the two carriers that may overlap, and the sum of the carrier bandwidths of the two carriers that may overlap minus the overlapping bandwidth equals the available spectrum resource. In this case, the radio access network device may notify the terminal device to use the two carriers, that is, the terminal device may fully use the available spectrum resource without being limited to the maximum carrier bandwidth at the subcarrier spacing.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, the apparatus, and the method may be implemented in other manners. For example, the foregoing apparatus embodiments are merely examples, the units are divided merely by a logical function and may be actually implemented by other partition types; a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAMy), a diskette, or a compact disc.

The foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof. Such modifications or replacements do not make the essence of the corresponding technical solutions depart from the spirit and the scope of the technical solutions of embodiments of this application.

What is claimed is:

1. A carrier configuration method, comprising:
   obtaining, by a radio access network device, an available spectrum resource bandwidth and a maximum carrier bandwidth at a subcarrier spacing; and
   configuring, by the radio access network device, a first carrier and a second carrier, wherein a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth.

2. The method according to claim 1, wherein the first carrier comprises a synchronization signal block (SSB), or the second carrier comprises an SSB.

3. The method according to claim 2, wherein the method further comprises:
   sending, by the radio access network device in a time division manner by using the SSB on the first carrier, SSB configuration information corresponding to the first carrier and SSB configuration information corresponding to the second carrier; or
   sending, by the radio access network device in a time division manner by using the SSB on the second carrier, SSB configuration information corresponding to the first carrier and SSB configuration information corresponding to the second carrier.

4. The method according to claim 1, wherein the first carrier comprises an SSB, and the second carrier comprises an SSB.

5. The method according to claim 4, wherein the method further comprises:
   sending, by the radio access network device by using the SSB on the first carrier, SSB configuration information corresponding to the first carrier, and sending, by using the SSB on the second carrier, SSB configuration information corresponding to the second carrier.

6. A carrier configuration method, comprising:
   obtaining, by a radio access network device, an available spectrum resource bandwidth and a maximum carrier bandwidth at a subcarrier spacing; and
   configuring, by the radio access network device, a first carrier and a second carrier, wherein a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth; and
   indicating, by the radio access network device, at least two terminal devices to send data in a space division manner on the overlapping bandwidth, wherein the at least two terminal devices respectively send the data on the first carrier and the second carrier.

7. The method according to claim 1, wherein the first carrier comprises an SSB, the first carrier is a primary component carrier, and the second carrier is a secondary component carrier of the first carrier; or the second carrier comprises an SSB, the second carrier is a primary component carrier, and the first carrier is a secondary component carrier of the second carrier.

8. The method according to claim 7, wherein the method further comprises:

sending, by the radio access network device on the primary component carrier, SSB configuration information corresponding to the primary component carrier.

9. The method according to claim 7, wherein the method further comprises:

indicating, by the radio access network device, a terminal device to send data on a bandwidth of a part of the secondary component carrier that does not overlap the primary component carrier, wherein the terminal device sends the data on the secondary component carrier.

10. A carrier configuration apparatus, comprising:

a processor; and a memory coupled to the processor, wherein the memory comprise instructions that, when executed by the processor, the apparatus perform operations comprising:

obtaining, an available spectrum resource bandwidth and a maximum carrier bandwidth at a subcarrier spacing; and configuring, a first carrier and a second carrier, wherein a sum of a first carrier bandwidth of the first carrier and a second carrier bandwidth of the second carrier is greater than the available spectrum resource bandwidth, and the sum of the first carrier bandwidth and the second carrier bandwidth minus an overlapping bandwidth between the first carrier and the second carrier equals the available spectrum resource bandwidth.

11. The apparatus according to claim 10, wherein the first carrier comprises a synchronization signal block (SSB), or the second carrier comprises an SSB.

12. The apparatus according to claim 10, wherein the operations further comprise:

sending, in a time division manner by using the SSB on the first carrier, SSB configuration information corresponding to the first carrier and SSB configuration information corresponding to the second carrier; or sending, in a time division manner by using the SSB on the second carrier, SSB configuration information corresponding to the first carrier and SSB configuration information corresponding to the second carrier.

13. The apparatus according to claim 10, wherein the first carrier comprises an SSB, and the second carrier comprises an SSB.

14. The apparatus according to claim 13, wherein the operations further comprises:

sending, by using the SSB on the first carrier, SSB configuration information corresponding to the first carrier, and sending, by using the SSB on the second carrier, SSB configuration information corresponding to the second carrier.

15. The apparatus according to claim 10, wherein the operations further comprises:

indicating, at least two terminal devices to send data in a space division manner on the overlapping bandwidth, wherein the at least two terminal devices respectively send the data on the first carrier and the second carrier.

16. The apparatus according to claim 10, wherein the first carrier comprises an SSB, the first carrier is a primary component carrier, and the second carrier is a secondary component carrier of the first carrier; or the second carrier comprises an SSB, the second carrier is a primary component carrier, and the first carrier is a secondary component carrier of the second carrier.

17. The apparatus according to claim 16, wherein the operations further comprises:

sending, on the primary component carrier, SSB configuration information corresponding to the primary component carrier.

18. The apparatus according to claim 16, wherein the operations further comprises:

indicating, a terminal device to send data on a bandwidth of a part of the secondary component carrier that does not overlap the primary component carrier, wherein the terminal device sends the data on the secondary component carrier.

* * * * *